UNITED STATES PATENT OFFICE.

KARL NERESHEIMER, CARL BOSCH, AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

MANUFACTURE OF UREA.

1,292,019.      Specification of Letters Patent.      Patented Jan. 21, 1919.

No Drawing. Original application filed April 16, 1915, Serial No. 21,911. Divided and this application filed December 20, 1916. Serial No. 138,122.

*To all whom it may concern:*

Be it known that we, KARL NERESHEIMER, CARL BOSCH, and ALWIN MITTASCH, citizens of the German Empire, residing at Ludwigshafen-on-the-Rhine, Germany, have invented new and useful Improvements in the Manufacture of Urea, of which the following is a specification.

As we have described in our original application Serial No. 21911 for the same invention, the production of urea from ammonium carbaminate can be considerably accelerated by heating the ammonium carbaminate with an addition of a catalyzer. The present application is a division of application Serial No. 21,911 filed April 16, 1915. In the present application, we wish to claim the employment of salts of light metals as catalyzers, which has been described in the said original application, but now is not claimed specifically therein. As we found, salts of light metals, within which term we include also the ammonium salts, possess, even when employed in small quantities, the property of accelerating the formation of urea. For instance, carbonates, nitrates, sulfates, sulfids, chlorids of the alkali metals—including ammonium—and of the alkaline earth metals can be used, but the use of the ammonium salts of carbonic acid—by which only water in a loosely combined state is introduced into the process—is not claimed in the present invention, this being included in the said original application. More than one of such salts can be used simultaneously, if desired, and at the same time a small quantity of water or of ammonium carbonate can be added which also will act catalytically, according to our copending application Serial Number 21911.

The following examples serve to illustrate the invention but the invention is not confined to the examples.

*Example 1.*

Mix ammonium carbaminate with 5% of potassium carbonate, grinding the bodies together. Heat the mixture in a vessel capable of withstanding pressure at a temperature of 135 to 140 degrees C. The formation of urea takes place much more quickly than with ammonium carbaminate alone. Instead of potassium carbonate the following can be used, sodium sulfate, sodium sulfid, sodium formate, calcium chlorid, and many others. These can be added in the dry state or in aqueous solution. If desired the catalyst can be removed from the end product, for instance by dissolving the urea in alcohol.

*Example 2.*

Mix together ammonium carbaminate and 3% of its weight of ammonium sulfite and heat the mixture as described in the previous example. From the product the catalyst together with the unaltered ammonium carbaminate, the ammonium carbonate and the water formed are removed by distillation. Ammonium salts of other acids can be employed in the same way, or free acids themselves may be added, forming at once the respective ammonium salts by decomposing some ammonium carbamate. As instances of suitable ammonium salts we mention the selenite, chlorid, acetate, oxalate, and citrate.

Now what we claim is:—

1. The manufacture of urea by heating ammonium carbaminate with an addition of a salt of a light metal.

2. The manufacture of urea by heating ammonium carbaminate with an addition of an ammonium salt of an acid other than carbonic acid.

3. The manufacture of urea by heating ammonium carbaminate with an addition of a salt of a light metal and water in a restricted quantity leaving at least half of the ammonium carbaminate unaltered.

In testimony whereof we have hereunto set our hands in the presence of two subscribing witnesses.

KARL NERESHEIMER.
    CARL BOSCH.
    ALWIN MITTASCH.

Witnesses as to Karl Neresheimer:
    HEINRICH ASCHENBRANDT,
    WILHELM MUSSEL.